May 9, 1967     D. W. WAGNER     3,318,521
APPARATUS FOR MEASURING THE DIMENSIONS
OF LUMBER AND THE LIKE

Filed March 20, 1964     7 Sheets-Sheet 1

*INVENTOR.*
DELMER W. WAGNER

BY *F. W. Geisler,*
ATTORNEY

INVENTOR.
DELMER W. WAGNER

BY
*T.A. Geisler*
ATTORNEY

INVENTOR.
DELMER W. WAGNER
BY
ATTORNEY

May 9, 1967

D. W. WAGNER 3,318,521

APPARATUS FOR MEASURING THE DIMENSIONS OF LUMBER AND THE LIKE

Filed March 20, 1964

INVENTOR.
DELMER W. WAGNER

BY *T. A. Geisler*

ATTORNEY

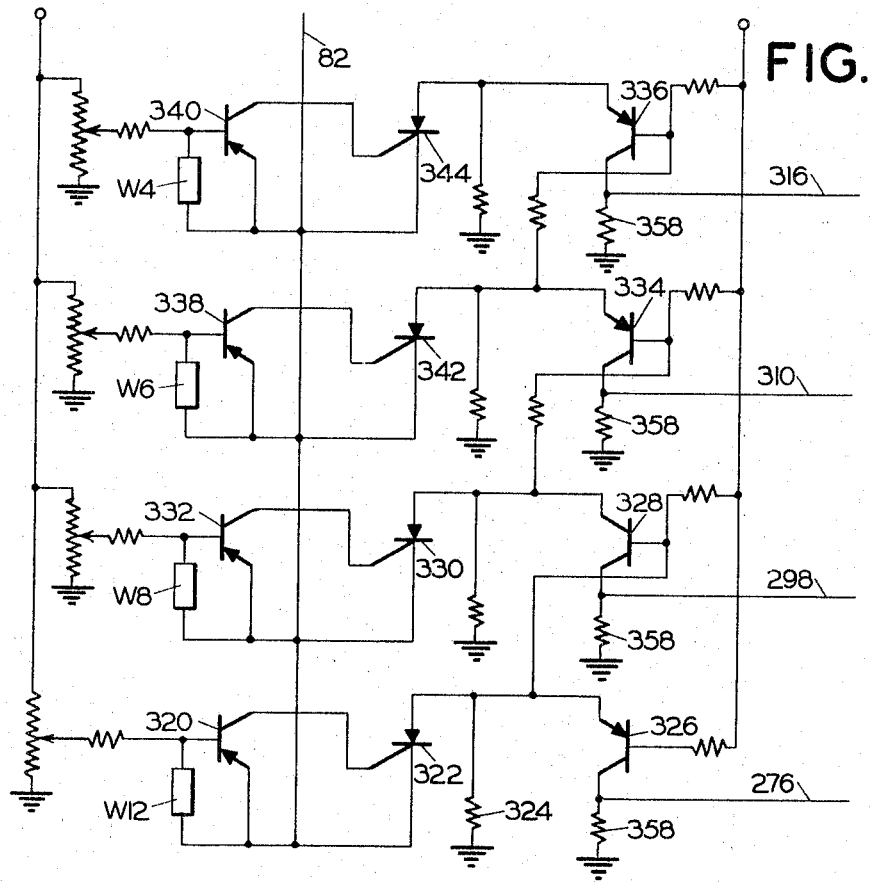
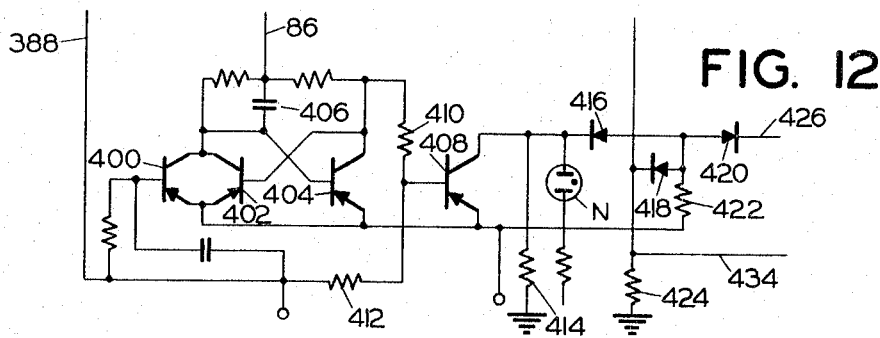
INVENTOR.
DELMER W. WAGNER
ATTORNEY

United States Patent Office 3,318,521
Patented May 9, 1967

3,318,521
APPARATUS FOR MEASURING THE DIMENSIONS OF LUMBER AND THE LIKE
Delmer W. Wagner, Terrebonne, Oreg., assignor to Whittier Moulding Company, Redmond, Oreg., a corporation of Oregon
Filed Mar. 20, 1964, Ser. No. 353,328
6 Claims. (Cl. 235—98)

This invention relates to measurement apparatus, and more particularly to apparatus for measuring one or more of the dimensions of lumber and other materials.

It is the principal object of the present invention to provide apparatus by which to measure automatically one or more of the dimensions of lumber and other materials during uninterrupted travel of the material along a process line.

Another important object of this invention is the provision of apparatus of the class described in which the material to be measured serves to activate the apparatus, whereby to accommodate the measurement of materials disposed at random positions along a conveying line.

Still another important object of the present invention is to provide apparatus of the class described in which the results of measurement may be utilized to activate a variety of types of output devices, such as a measurement recording machine, a lumber sorting device, and others.

A further and specific objective of the present invention is the provision of apparatus of the class described for measuring the length, width, thickness, surface area, or board feet of lumber products.

Other objects and advantages attained through the medium of the present invention will become apparent from the following detailed description in which reference is made to the accompanying drawings.

In the drawings:

FIG. 11 is a schematic diagram of an alternate form of a portion of an electric circuit for the width measuring component;

FIG. 12 is a schematic diagram of an electric circuit of a digit storage component of the electrical system embodied in the apparatus, a plurality of which are illustrated in block form in FIG. 7; and FIG. 13 is a schematic diagram of an electric circuit for the output solenoid switch component of the electrical system, a plurality of which are shown in block form in FIG. 7.

Figure 1:
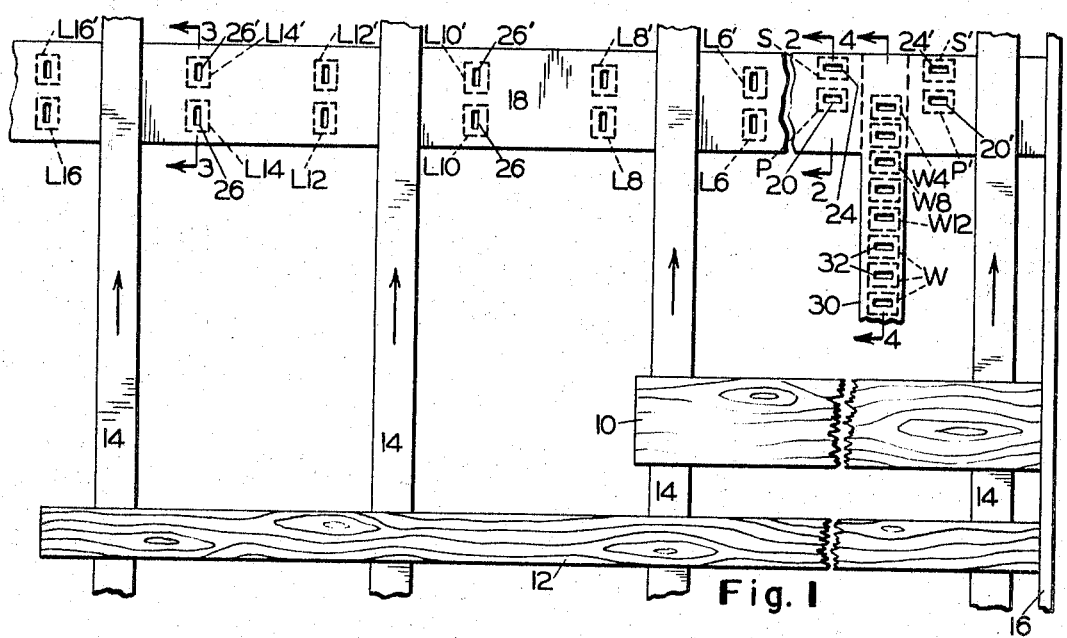
FIGURE 1 is a fragmentary foreshortened plan view of a lumber conveyor system in association with lumber, the dimension detecting component representing a part of and embodying features of the measuring apparatus of the present invention.
Figure 2:
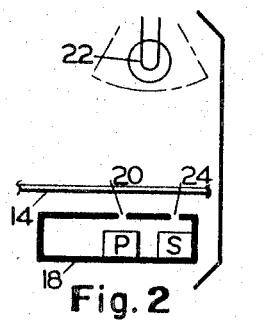
FIG. 2 is a fragmentary sectional view taken along the line 2—2 in FIG. 1 and showing an arrangement of a light source and photosensitive elements for the prefire and start components embodied in the apparatus of the present invention.
Figure 3:
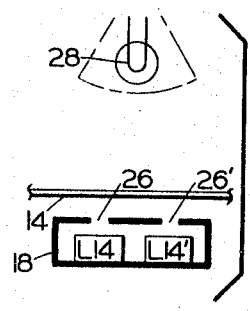
FIG. 3 is a fragmentary sectional view taken along the line 3—3 in FIG. 1 and showing an arrangement of a light source and photosensitive elements for the length measuring component embodied in the apparatus of the present invention.
Figure 4:
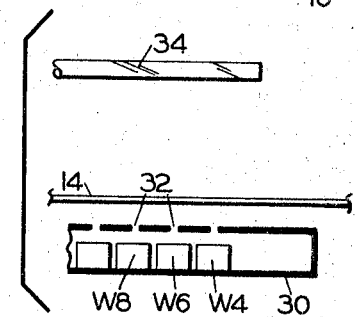
FIG. 4 is a fragmentary sectional view taken along the line 4—4 in FIG. 1 and showing an arrangement of a light source and photosensitive elements for the width measuring component embodied in the apparatus of the present invention.

The fundamental concept of the present invention involves the passing of lumber or other material between light sources and photosensitive devices spaced at predetermined intervals parallel to the dimensions of the material, thereby interrupting the light sources over the dimension or dimensions of the material, utilizing the change of electrical characteristic of the photosensitive devices thus interrupted to produce electric signals corresponding to the dimension or dimensions being measured, and utilizing these electric signals to actuate appropriate electrical output devices such as a dimension recording machine, lumber sorter, etc. In the event it is desired to measure the surface area of the material, the electrical signals corresponding to the length and width of the material are combined to produce another electric signal representing the area, and this signal then is utilized to actuate an appropriate electrical output device.

Referring first to FIGS. 1-4 of the drawings, pieces of lumber 10, 12 of random dimensions are supported at random spacings upon a plurality of laterally spaced conveyor belts or chains 14 with one end of the lumber pieces disposed in sliding abutment against a stationary reference guide edge 16. Alternatively, this guide edge may take the form of a continuously driven belt moving at the same speed as the conveyor system.

Disposed under the working stretches of the conveyors and extending transversely thereof is an elongated housing 18. A pair of openings 20, 20' are provided in the top plate of the housing, spaced apart longitudinally thereof, for communicating to a pair of photosensitive elements P, P' disposed in the housing (FIG. 2) the rays of light provided by electric lamps 22 supported above the conveyor system and lumber supported thereon. These photosensitive devices are in the electric circuit of the prefire component, as explained more fully hereinafter.

The top plate of the housing also is provided with a second pair of openings 24, 24' spaced apart longitudinally of the housing and spaced from the first pair of openings 20, 20' in the direction of travel of the conveyor system. These openings 24, 24' communicate the light sources 22 to photosensitive elements S, S' disposed in the housing and arranged in the electric circuit of the start component.

The top plate of the housing also is provided with a plurality of pairs of openings 26, 26' disposed at predetermined distances along the latter from the reference guide edge 16, parallel to the length of the lumber pieces carried on the conveyor system. In the embodiment illustrated the pairs of openings are spaced apart at two foot intervals from six to sixteen feet from the guide edge. These openings function in the measurement of the lengths of pieces of lumber. The openings of each pair are spaced apart in the direction of movement of the conveyor system, and each opening communicates the rays of light from an electric lamp 28 (FIG. 3) positioned above the conveyor system and lumber supported thereon to the pairs of photosensitive elements L6, L6'; L8, L8'; L10, L10'; L12, L12'; L14, L14'; and L16, L16'.

A second elongated housing 30 is supported by the first named housing 18 and extends perpendicular thereto, opposite the direction of movement of the conveyor system. The top plate of this housing, preferably disposed in the plane of the top plate of the first named housing, is provided with a plurality of openings 32 spaced apart longitudinally thereof at predetermined intervals. These openings function in the measurement of the widths of pieces of lumber.

In actual practice these openings are spaced apart at intervals of one-quarter inch over a distance to measure widths between about four inches and about thirty inches. However, for simplicity of the present disclosure they are assumed to be spaced apart at intervals of two inches.

Accordingly, the first opening 32 is spaced two inches rearwardly from a line extending between the pair of openings 24, 24' associated with the photosensitive elements S, S' of the electrical start components, and the remaining openings 32 trailing the first are spaced at two inch intervals relative thereto. The width openings communicate to photosensitive elements W mounted in the housing 30, the light rays emanating from an electric lamp, for example the elongated tungsten filament or fluorescent tube 34 (FIG. 4) supported above the conveyor system and lumber supported thereon. In the embodiment illustrated for purpose of the present disclosure there are four width measuring photosensitive elements W4, W6, W8 and W12, arranged to measure widths of 4, 6, 8 and 12 inches, respectively.

Figure 5:
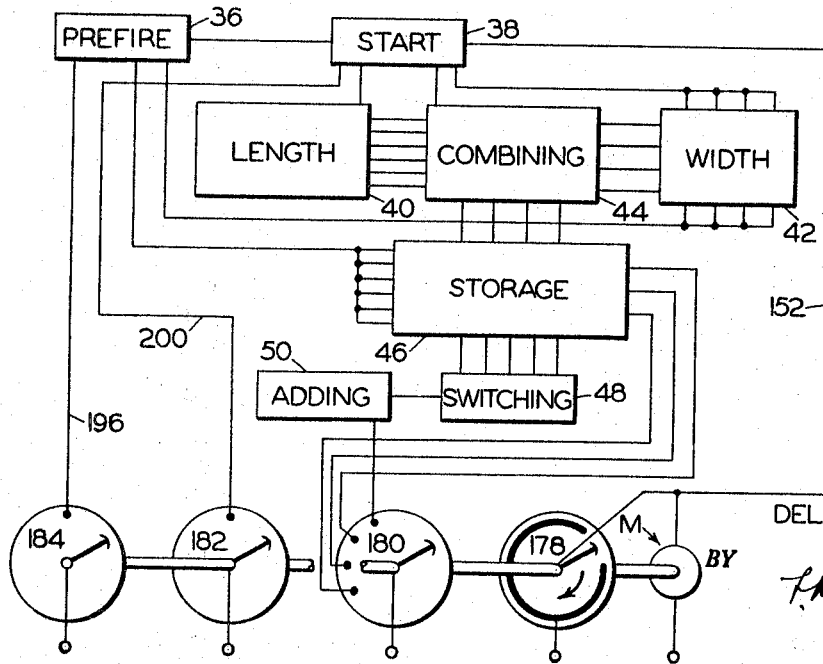
FIG. 5 is a schematic block diagram showing a general electrical circuit arrangement for the apparatus of the present invention.

Referring now to FIG. 5 of the drawings, the general arrangement illustrated is best explained in connection with the operation of the apparatus, as follows: As a piece of lumber is conveyed to the position at which it overlies and obstructs one or both of the openings 20, 20' associated with the prefire photosensitive elements P, P' the prefire component 36 is activated to place portions of the electrical system in readiness to perform the measuring operation. As a piece of lumber then progresses forward to the position at which it obstructs one or both of the openings 24, 24' associated with the photosensitive elements S, S' of the start component 38 of the electrical system, the piece of lumber also obstructs certain of the pairs of openings 26, 26' associated with the photosensitive elements L of the length measuring component 40 and also certain of the openings 32 associated with the photosensitive elements W of the width measuring component 42. Those photosensitive elements from which the light rays have thus been interrupted thereupon produce electric signals in the length and width components, and these signals are combined in the combining component 44 to provide another electric signal which represents the surface area of that piece of lumber. This signal is fed to the digit storage component 46 which is scanned on a timed sequence so that the signal is caused to activate appropriate circuits of the solenoid switching component 48 which, in the embodiment illustrated, is associated with an electrically actuated adding machine 50 to cause the latter to record on a tape the numerical value of the area of the piece of lumber.

Figure 8:
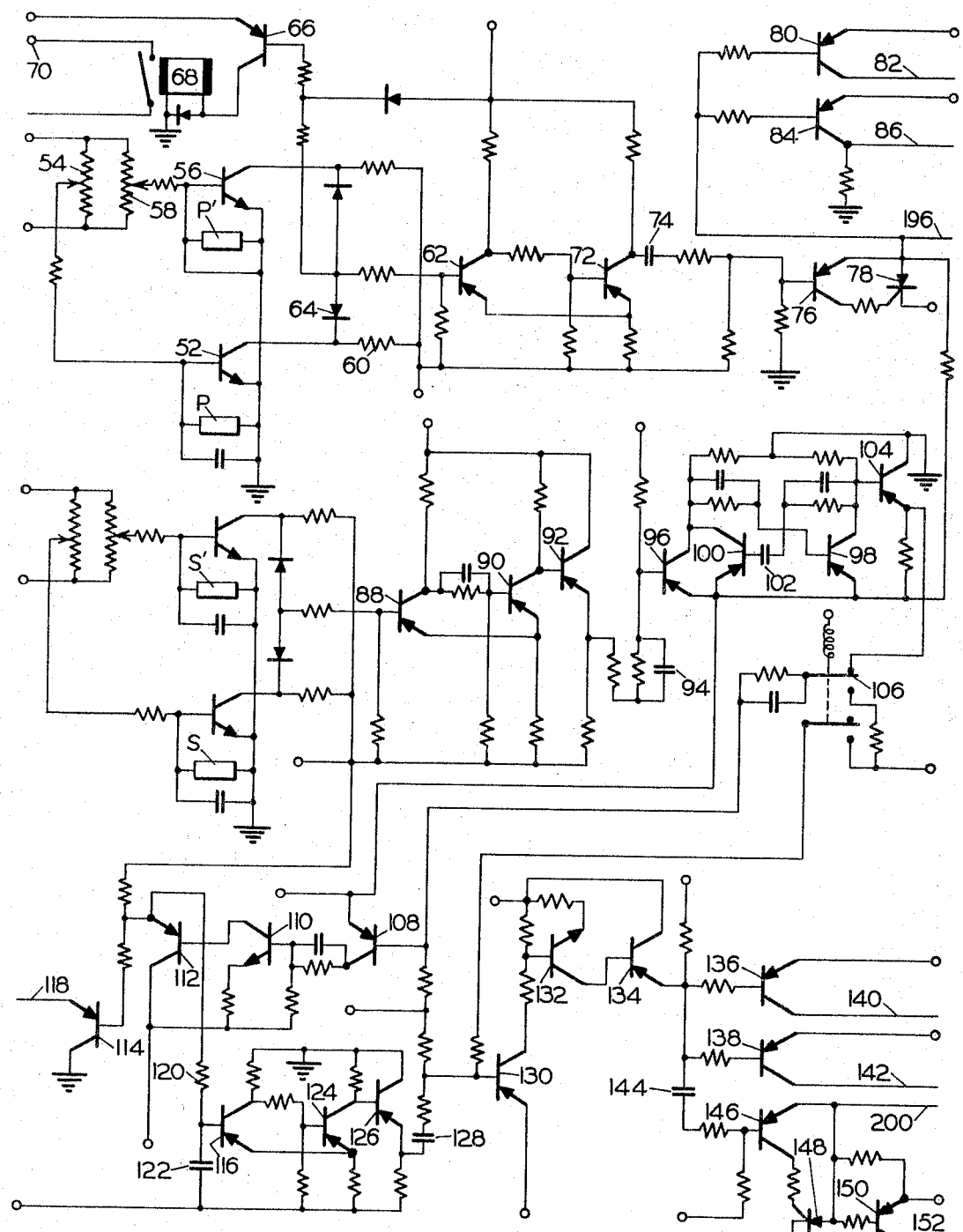
FIG. 8 is a schematic diagram of an electric circuit for the prefire and start components of the electrical system embodied in the apparatus of the present invention and illustrated in block forms in FIGS. 5 and 6.

Referring now to FIG. 8 of the drawings, the illustrated electrical circuits for the prefire and start components are best explained in connection with the operation of the apparatus, as follows: Let it be assumed that a piece of lumber has been conveyed into the position interrupting the light source 22 to the photosensitive element P, but that because of the presence of a knot hole or other imperfection in the piece of lumber the light source to the photosensitive element P' is not interrupted. Thus, upon interruption of the light to element P, its electrical characteristic changes to bias transistor 52 to conduction, as established by prior adjustment of potentiometer resistance 54. This adjustment is made by covering the element P and adjusting the potentiometer resistance until transistor 52 conducts to the extent necessary to operate the associated circuitry. The same initial adjustment is made for transistor 56, by adjustment of potentiometer resistance 58.

The photosensitive elements may be of the photosensitive type in which a resistance element varies in magnitude with varying exposure to light. Alternatively, the photosensitive elements may be of the photocell type which produces an electric signal directly on exposure to light.

Conduction of transistor 52 causes a voltage drop to appear across the collector load resistance 60, effecting conduction of transistor 62 to diode 64.

It will be understood that in the event the piece of lumber interrupts the light to photosensitive element P', transistor 56 will be biased to conduction to effect conduction of transistor 62, in the same manner achieved by the conduction of transistor 52. Thus, it will be understood that the pair of photosensitive elements P and P' are provided merely to insure activation of the prefire circuit by at least one of them. It will be further understood, therefore, that one of the photosensitive elements and its associated circuitry may be eliminated, if desired.

At the same time transistor 62 conducts, transistor 66 is activated to conduction, energizing the relay 68 to close its associated contact and complete the electric circuit of a source 70 of potential, for example a negative 70 volts, for operating the neon indicator lamps described more fully hereinafter.

Transistor 62 in combination with transistor 72 forms a Schmidt trigger circuit. Upon conduction of transistor 62, transistor 72 is cut off and the negative signal from its collector is applied to capacitor 74. As the capacitor charges, a negative pulse is applied to the base of transistor 76, causing the latter to conduct and effect conduction of the silicon control rectifier 78. As explained more fully hereinafter, this rectifier will remain in conduction for the cycle of operation of the apparatus.

Conduction of rectifier 78 effects conduction of transistor 80 to provide at line 82 an operating potential, for example 12 volts, to the circuits of the width component 42. Similar conduction of transistor 84 will provide at line 86 an operating potential, for example 3 volts to the circuits of the combining component 44.

Assume now that the piece of lumber has moved forward to interrupt the light 22 to either or both of the photosensitive elements S, S' to effect activation of the Schmidt trigger circuit which includes transistors 88 and 90, in manner similar to the activation of transistors 62 and 72 described hereinbefore. The negative output pulse from transistor 90 causes conduction of the emitter follower transistor 92, and the negative output pulse therefrom is transferred through capacitor 94 to the base of phase inverter transistor 96, effecting conduction thereof. Conduction of this transistor produces a positive pulse of short time duration which is applied to the base of the normally conducting transistor 98 which, with transistor 100 forms a multivibrator circuit. The multivibrator thus reverses, with transistor 100 conducting for a period of time determined by the charging time of capacitor 102, after which it is cut off and the transistor 98 again conducts.

The negative output pulse from the multivibrator is applied through the emitter follower transistor 104 and the normally closed test switch 106 to the base of transistor 108. Conduction of transistor 108 produces a positive output pulse which is applied through amplifier transistor 110 to the base of transistor 112. Conduction of this transistor 112 applies the negative pulse to the bases of transistors 114 and 116.

Conduction of transistor 114 provides a grounding impulse which is applied through line 118 to the circuits of the width component 42 described hereinafter.

Conduction of transistor 116 is delayed by the time constant of resistor 120 and capacitor 122. Upon conduction of transistor 116 which, with transistor 124 forms a Schmidt trigger circuit, a negative output pulse from the latter is applied through the emitter follower transistor 126 and capacitor 128 to transistor 130. Capacitor 128 is sufficiently small so that only the leading edge of the pulse is applied to transistor 130 which forms a phase inverter for transistor 132. The positive pulse from transistor 130 effects conduction of transistor 132, and its negative output pulse is applied through the emitter follower transistor 134 to the bases of transistors 136 and 138, causing them to conduct.

Conduction of transistor 136 provides an operating potential, for example a 12 volt impulse, to be applied through line 140 to the circuits of the combining component 44. Conduction of transistor 138 provides an operating potential, for example a 16 volt impulse, to be applied through line 142 to the circuits of the width measuring component 42.

The time delay provided by capacitor 122 insures completion of switching of the output circuitry of the width circuits, as necessitated by the different switching time in each width circuit unit. This capacitor may be omitted, if desired, since the time delay inherent in the operation sequence of the circuit including transistors 116 to 134 is sufficient for this purpose.

The negative output pulse from transistor 134 also is applied through capacitor 144 to transistor 146, causing the latter to conduct and provide a positive pulse to the gate of silicon controlled rectifier 148, causing the latter and transistor 150 to conduct.

Conduction of transistor 150 provides an output potential which is applied through line 152 to a sequence control drive motor M (FIG. 5). In the specific embodiment illustrated best in FIG. 7 this motor is in the form of a ratcheting relay, the coil 154 of which is connected to line 152. Activation of this relay effects momentary attraction of its pivoted armature 156 which performs the dual function of retracting the connected ratchet pawl 158 against the resistance of the resilient spring 160, and also breaks the electrical contact 162 in the relay circuit. The relay thus is deenergized and its pivoted armature is retracted to the position illustrated, by means of the spring, whereupon the ratchet pawl effects a stepwise rotation of the ratchet gear 164 in the clockwise direction indicated. Additionally, the retracted relay armature again closes the contact 162 in the relay circuit, whereupon the foregoing sequence of intermittent actuation of the relay and stepwise rotation of the ratchet gear is continued through a cycle of operation.

In this regard the ratchet gear rotates a shaft 166 on which are secured, in electrical isolation from each other and from the shaft, a plurality of electrical contact brushes 168, 170, 172 and 174. Each of these brushes is associated with a stationary contact plate 178, 180, 182 and 184, respectively, of electrical non-conductive material. The conical plate 178 supports an electrically conductive split ring 188 arranged for engagement by the associated brush 168, and is connected electrically through line 190 to a source of positive potential. The brush 168 is connected through line 152 to the output of transistor 150, as is the ratchet relay coil 154, so that after initial actuation of the relay to move the brush 168 from the illustrated start position intermediate the ends of the split ring 188 to the position of contact with the ring, the electric circuit of the relay then is maintained through the ring. Thus, the brush and ring constitute a cycle control switch which maintains operation of the ratchet relay through one revolution of the ratchet gear, the relay being deenergized when the brush rotates out of engagement with the ring into the start position between the spaced ends of the ring.

Just prior to the return of brush 168 to the start position, brush 174 will have been rotated into engagement with a contact 192 carried by the plate 184. The brush is connected through line 194 to a source of electric potential, for example a negative six volts, and the contact is connected through line 196 to a silicon controlled rectifier 78 in the prefire circuit (FIG. 8) to short the latter and deactivate the prefire circuit just before the cycle is completed.

Brush 172 is connected through line 197 to a negative potential, for example minus six volts, and is similarly rotated into engagement with a contact 198 on plate 182, which contact is connected through line 200 to the silicon controlled rectifier 148 in the ratchet relay circuit (FIG. 8), whereby to short the rectifier 148 and deactivate the ratchet relay circuit just before the cycle of operation is completed.

Figure 6:
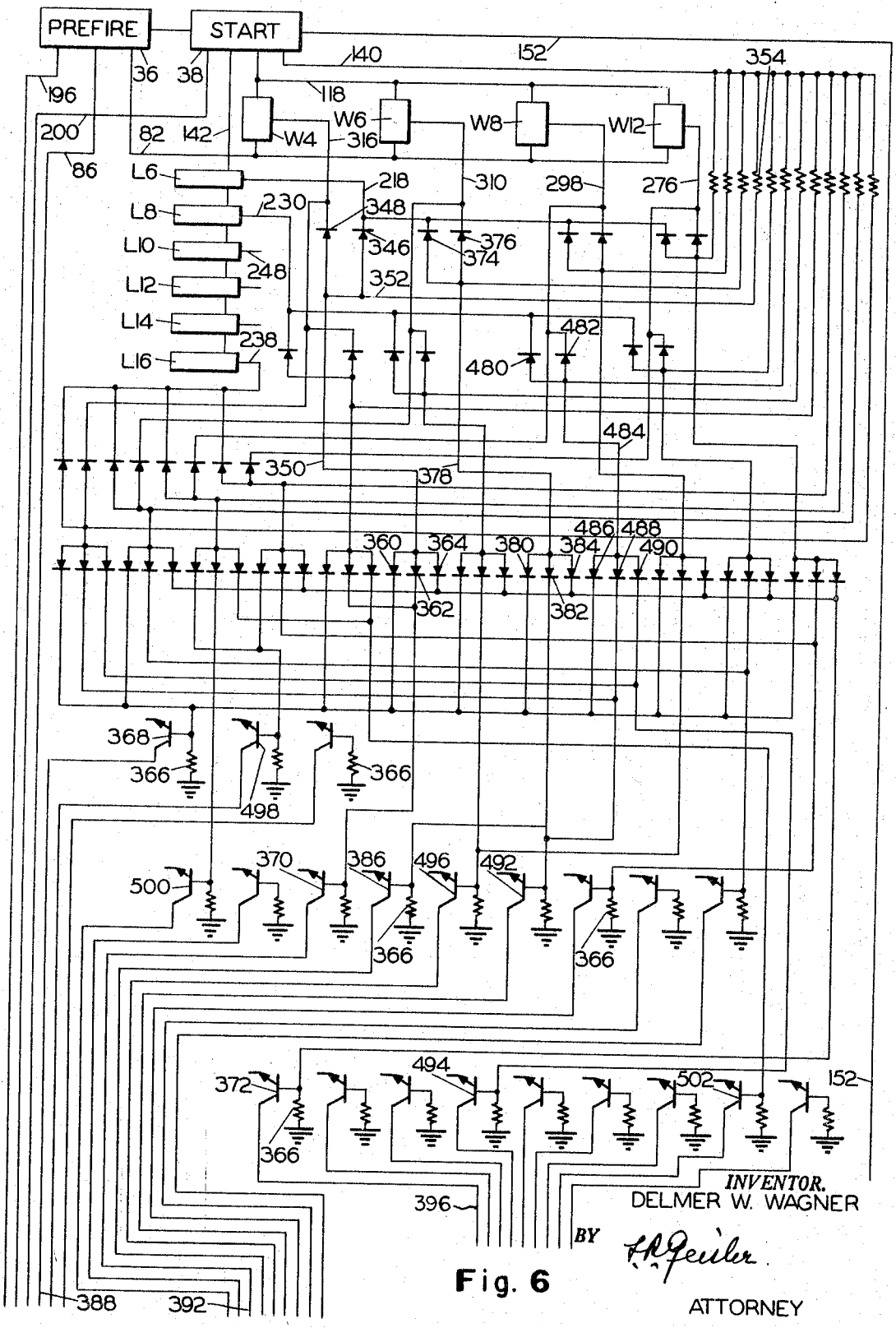
FIGS. 6 and 7 represent a composite electrical circuit diagram, partly in block form, showing in greater detail the general circuit diagram of FIG. 5.
Figure 9:
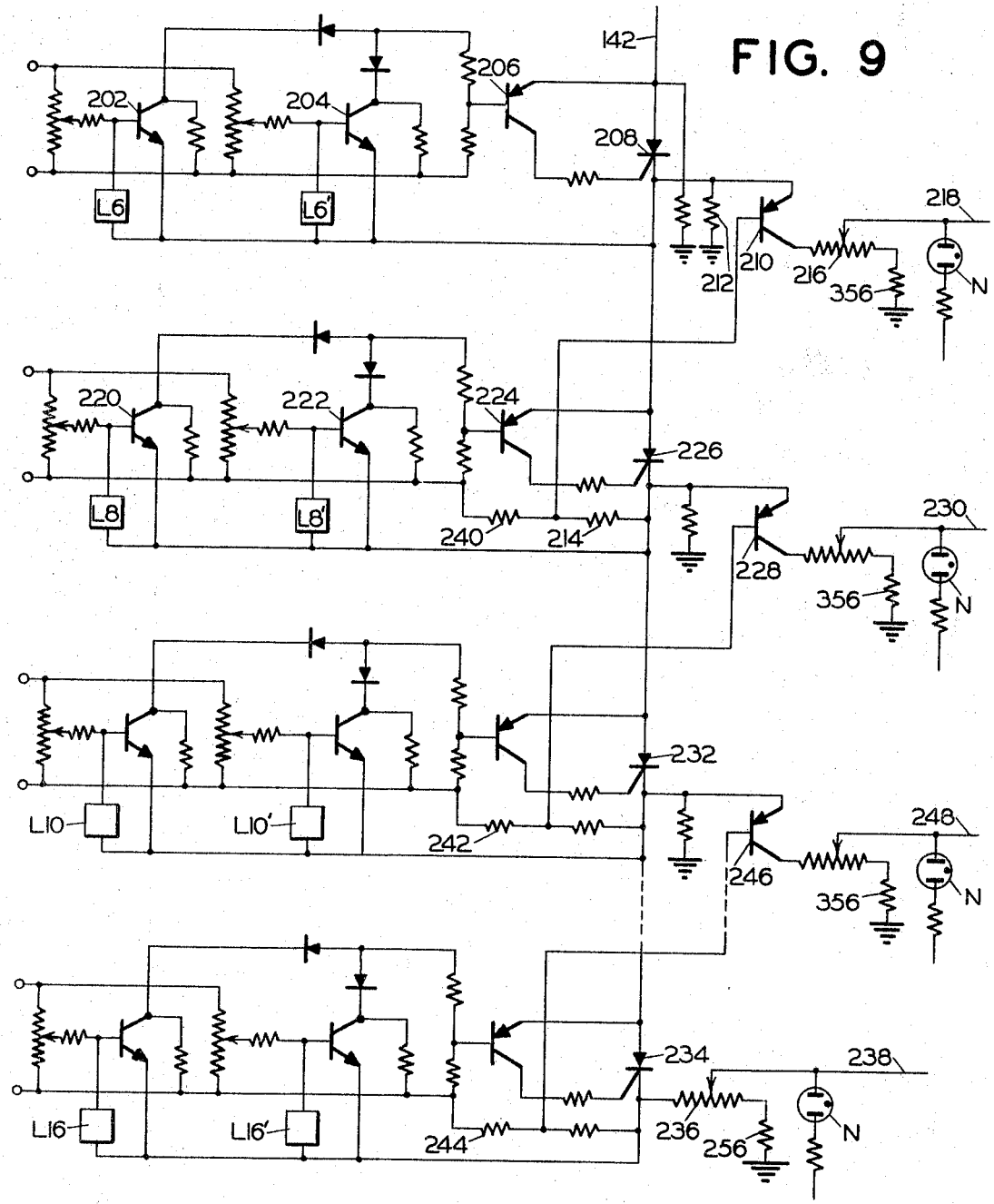
FIG. 9 is a schematic diagram of a portion of an electric circuit for the length measuring component of the electrical system embodied in the apparatus of the present invention and illustrated in block form in FIGS. 5 and 6.

The circuits of the length measuring component 40 illustrated in block form in FIGS. 5 and 6 are detailed in FIG. 9. Let it be assumed for purposes of illustration that the piece of lumber 10 is about seven feet in length and has been moved forward to overlie the housing 18 (FIG. 1). Accordingly, the piece of lumber interrupts the light to one or both of the photosensitive elements L6 and L6′ registering with the slots 26, 26′ located six feet from the guide edge 16, but does not interrupt the light to the photosensitive elements L8 and L8′ registering with the slots located a distance eight feet from the guide edge. Accordingly, the interruption of light to one or both of the photosensitive elements L6 and L6′ results in the biasing of the associated transistors 202 and 204, respectively, to conduction.

As in the case of the pairs of photosensitive elements in the prefire and start circuits, the pair of photosensitive elements L6 and L6′ and associated circuitry are provided to insure activation of at least one of them by the piece of lumber.

Conduction of either or both of the transistors 202 and 204 provides a negative potential to the base of transistor 206. This is effected by virtue of the emitter of transistor 206 being connected to the 16 volt impulse supplied through line 142 from the start circuit (FIG. 8). Conduction of transistor 206 causes the silicon controlled rectifier 208 to conduct, applying a potential to the emitter of transistor 210. Since resistances 212 and 214 are small, the base of transistor 210 is negative with respect to its emitter, and therefore the transistor conducts, producing an output pulse. The magnitude of this pulse is adjustable by the potentiometer resistance 216, and the pulse is applied through line 218 to the combining circuit (FIG. 6) as representing a length of six feet.

It is to be noted in the above example that since the piece of lumber is less than 8 feet long, the photosensitive elements L8 and L8′ are not obstructed and therefore transistors 220, 222 and 224 remain nonconducting and the silicon controlled rectifier 226 does not conduct a pulse to transistor 228. Accordingly, there is no output pulse from this transistor through line 230 to the combining circuit to represent a measured length of eight feet.

However, if the piece of lumber were 16 feet long, at least one of each pair of length measuring photosensitive elements illustrated in FIG. 1, including L16 and L16′, would be obstructed from its light source and therefore all of the silicon controlled rectifiers 208, 226, 232 and 234 in the series would conduct and an output pulse would be supplied through the variable potentiometer resistance 236 and line 238 to the combining circuit to represent a measured length of sixteen feet.

However, when the piece of lumber is longer than the minimum length measurable by the apparatus, it is necessary to prevent an output pulse to the combining circuit from the shorter length measuring circuits. For example, if the piece of lumber is 8 feet long, it is necessary that the 6 foot length measuring circuit provide no output pulse through line 218 to the combining circuit. Accordingly, resistance 240 is provided to raise the bias at the base of transistor 210 to cut off the latter. Similarly, if the piece of lumber is 16 feet long, the resistances 240, 242 and 244 will effect cutting off the transistors 210, 228 and 246 to prevent the development of output pulses through lines 218, 230 and 248 to the combining circuit from all the length measuring circuits preceding the 16 foot circuit.

Figure 10:
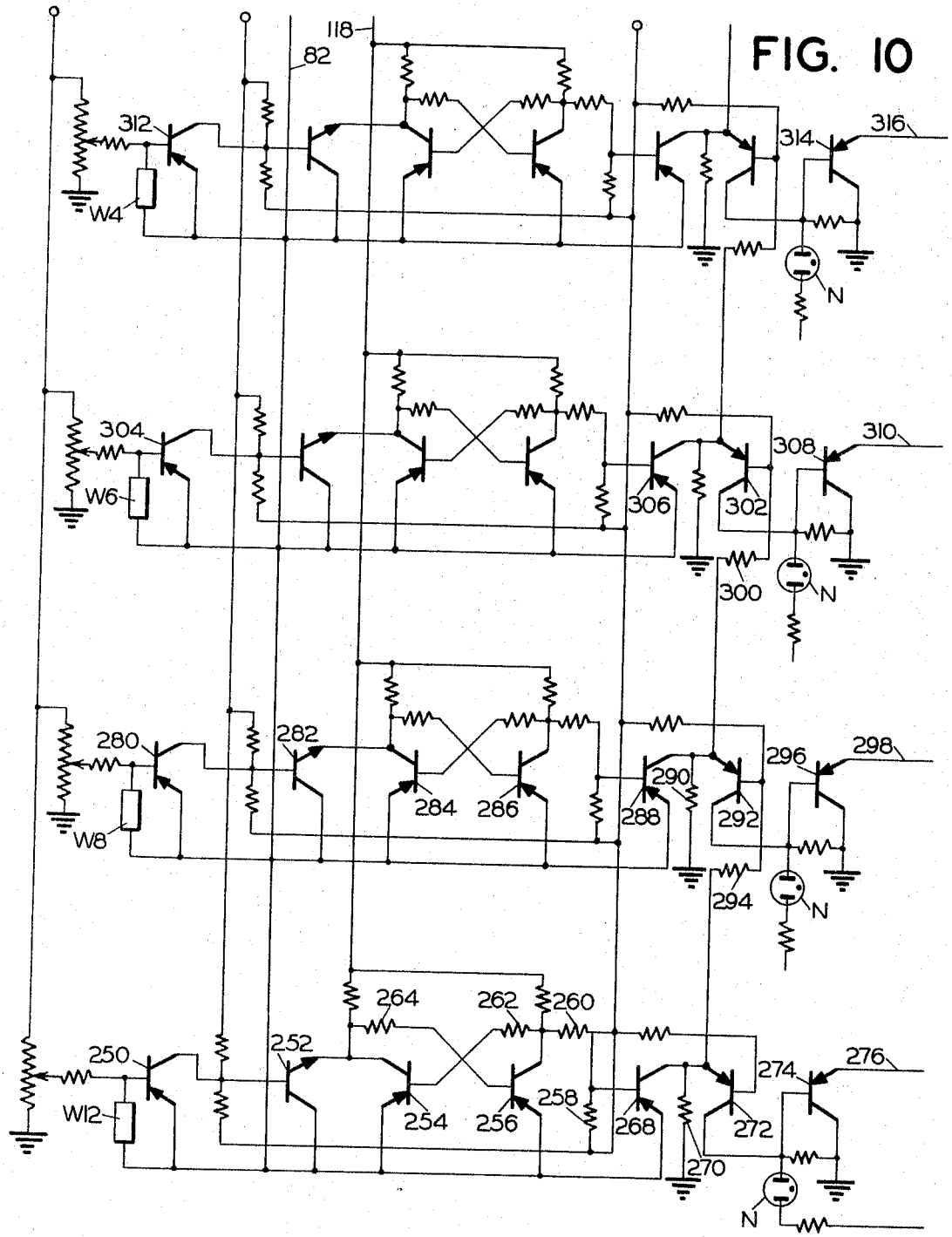
FIG. 10 is a schematic diagram of a portion of an electric circuit for the width measuring component of the electrical system embodied in the apparatus of the present invention and illustrated in block form in FIGS. 5 and 6.

The circuits of the width measuring component 42 illustrated in block form in FIGS. 5 and 6 are detailed in FIGS. 10 and 11. In FIG. 6 there are four block forms of width measuring circuits representing widths of 4, 6, 8 and 12 inches, and each of these circuits includes a photosensitive element W associated with the appropriate opening 32 in the secondary housing 30, as explained hereinbefore.

Considering first the embodiment illustrated in FIG. 10, let it be assumed for purposes of illustration that the width of the piece of lumber to be measured is 8 inches.

Accordingly, when the piece of lumber actuates the start circuit 38 it also covers and obstructs the light to the photosensitive elements W4, W6 and W8 associated with the 4 inch, 6 inch and 8 inch openings. However, the photosensitive element W12 associated with the 12 inch opening remains uncovered, and therefore its associated transistor 250 is biased to nonconduction, retaining transistor 252 in its state of nonconduction as provided by the positive potential supplied through line 82 from the prefire circuit. The multivibrator, which includes transistors 254 and 256, thus remains in its normal state in which transistor 256 is conducting and transistor 254 nonconducting.

This normal condition of the multivibrator is provided by virtue of the fact that, upon application of the grounding impulse through line 118 from the start circuit, transistor 254 is less conductive because of the reverse bias applied through resistors 258, 260 and 262, and also because of the fact that the lower resistance 264 causes conduction of transistor 256 first.

With transistor 256 conducting, the base of transistor 268 is held sufficiently positive to maintain it nonconducting. Accordingly, no output pulse appears across the low resistance 270 and therefore transistors 272 and 274 remain nonconducting. As a result no output pulse is provided from the latter through line 276 to the combining circuit.

However, the exemplified piece of lumber has covered the 8 inch width opening and thus has obstructed the light from the photosensitive element W8 to bias the associated transistor 280 to conduction. The voltage drop across the load resistor from this transistor thus effects conduction of transistor 282, providing a shorting impulse to the normally nonconducting transistor 284 and upsetting the balance of the multivibrator which includes normally conducting transistor 286. Upon conduction of transistor 282 the multivibrator reverses and the output potential from transistor 284 is applied to the base of transistor 288, causing the latter to conduct. The output potential from transistor 288 is applied across resistor 290 to the emitter of transistor 292. This potential is more positive that the base of transistor 292 by virtue of the latter having been drawn more negative through resistors 270 and 294. Accordingly, transistor 292 conducts and its output pulse is applied through emitter follower transistor 296 to provide an output pulse through line 298 to the combining circuit as representing the measured width of eight inches.

The positive output pulse from transistor 288 also is applied through resistance 300 to the base of transistor 302. Accordingly, although the photosensitive element W6 has been obstructed from its light source to bias the associated transistor 304 to conduction, the output pulse from conducting transistor 306 is not sufficiently positive to effect conduction of transistor 302. Therefore, no output pulse is provided from transistor 308 through line 310 to the combining circuit. In similar manner, although the interruption of light to photosensitive element W4 has effected conduction of transistor 312, no output pulse is provided from transistor 314 through line 316 to the combining circuit.

Referring now to FIG. 11, the multivibrator sections of FIG. 10 have been replaced by silicon controlled rectifiers. Thus, in the illustrated example wherein the piece of lumber being measured has a width of 8 inches, the photosensitive element W12 is unobstructed, thereby biasing the associated transistor 320 to nonconduction, preventing the firing of the silicon controlled rectifier 322 and providing no output pulse across resistor 324 or to the transistor 326, so that no output pulse is supplied through line 276 to the combining circuit. However, with no output pulse across resistor 324, the base of transistor 328 is more negative than its emitter to which an output pulse is applied from the conducting rectifier 330 due to the conduction of transistor 332 resulting from its being biased to conduction by the light obstructed photosensitive element W8. Accordingly, an output pulse from the conducting transistor 328 is applied through line 298 to the combining circuit to indicate that the piece of lumber being measured is eight inches wide. As in the embodiment of FIG. 10, the output transistors 334 and 336 remain nonconducting, although their associated photosensitive elements W6 and W4, respectively, have been obstructed from light and thus have effected conduction of their associated transistors 338 and 340 and rectifiers 342 and 344, respectively.

Referring now to FIG. 6 for the combining circuit, the output line from each length circuit and from each width circuit are connected together through a pair of diodes. Thus, the output line 218 from the 6 foot length circuit and the output line 316 from the 4 inch width circuit are connected together through the diodes 346 and 348, respectively, to the common connecting line 350. This line is connected through line 352 and resistor 354 to the line 140 that supplies the positive source of potential from the start component 38.

It is to be noted that the length circuits in FIG. 9 are grounded through resistors 356 and that the width circuits in FIG. 10 are grounded through the transistors 274, 296, 308 and 314 and in FIG. 11 through the resistances 358. Thus, when the length circuit L6 and width circuits W4 are activated to indicate the length and width measurements of a piece of lumber 6 feet long and 4 inches wide, the anodes of the corresponding diodes 346 and 348 are raised toward the operating potential supplied through line 140 from the start circuit. This positive voltage is applied through the connecting line 350 to the anodes of the associated three diodes 360, 362 and 364, whose cathodes are grounded through the resistors 366 and connected to the bases of the transistors 368, 370 and 372. The emitters of these and all of the other associated transistors are connected to a source of positive bias potential, for example six volts.

With the bases of transistors 368, 370 and 372 raised to conduction, a three digit output is obtained. Since the area of the exemplified piece of lumber 6 feet long and 4 inches wide is 2 square feet, the diode 360 is connected to the base of transistor 368 representing zero in the tens column. The transistors in this column represent, from left to right, the digits 0, 10 and 20. The second diode 362 is connected to the base of the transistor 370 representing the value 2 in the units column. The transistors in this column represent, from left to right, the digits from 0 to 8. The third diode 364 is connected to the base of the transistor 372 representing zero in the tenths column. The transistors in this column represent, from left to right, the digits from 0 to 0.9.

In similar manner the output line 218 from the 6 foot length circuit and the output line 310 from the 6 inch width circuit are connected together through the pair of diodes 374 and 376 to the common connecting line 378 connected to the anodes of three diodes 380, 382 and 384. Since the area of a piece of lumber measuring 6 feet long and 6 inches wide is three square feet, diode 380 is connected to the base of the transistor 368 representing zero in the tens column, the second diode 382 is connected to the base of the transistor 386 representing three in the units column, and the third diode 384 is connected to the base of the transistor 372 representing zero in the tenths column.

In manner similar to the foregoing, the output line from each length circuit and the output line from each width circuit are connected together through pairs of diodes and each common connecting line is connected to the anodes of a separate group of three diodes each of which in turn is connected to the base of the appropriate transistor representing a digit of the numerical value of the corresponding surface area of a piece of lumber.

It will be understood that if more or fewer digits are desired to indicate numerical values, each of the foregoing groups of three diodes may be modified to include more or fewer diodes.

Figure 7:
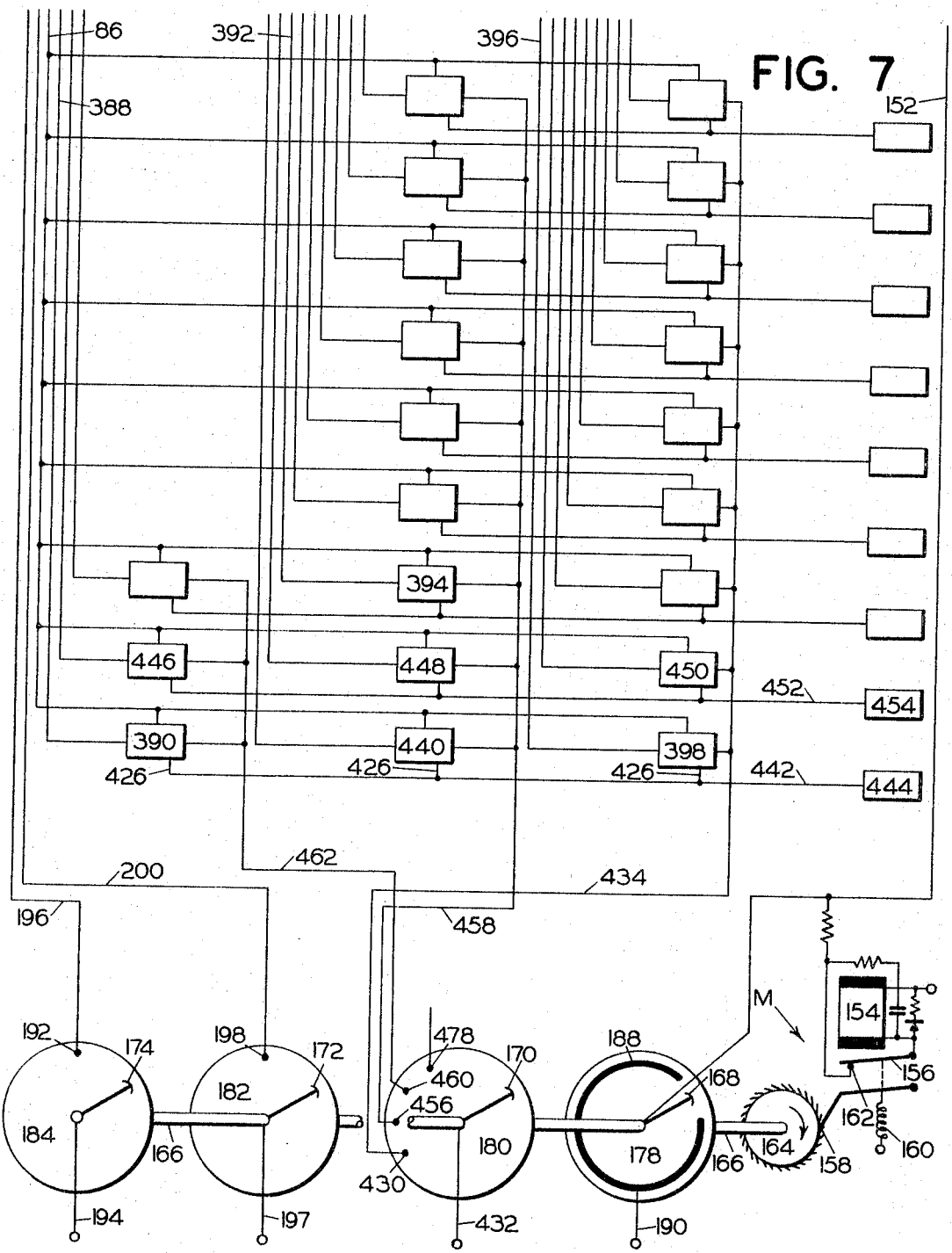

The collector of each of the digit transistors in the combining circuit columns is connected to the input of a separate and corresponding digit storage circuit, a plurality of which are illustrated in block form in FIG. 7. They are arranged, in the embodiment illustrated, in columns of tens, units and tenths, as indicated. Thus, transistor 368 is connected through line 388 to digit storage unit 390 representing zero in the tens column; transistor 370 is connected through line 392 to digit storage unit 394 representing 2 in the units column; transistor 372 is connected through line 396 to digit storage unit 398 representing zero in the tenths column; and so on.

Each of the storage circuits is identical in circuit construction, and one of them is detailed in FIG. 12. For purposes of explanation, let it be assumed that an output pulse is applied from transistor 368 through line 388 to the base of transistor 400, causing the latter to conduct. This effects reversal of the multivibrator which includes normally nonconducting transistor 402 and normally conducting transistor 404. Potential to effect the normal state of multivibrator action is supplied through capacitor 406 and the line 86 from the prefire circuit. With transistor 404 normally conducting reverse bias is applied to the base of transistor 408 to maintain it in its nonconducting state. However, upon the application of an output pulse from the transistor in the combining circuit and consequent reversal of the multivibrator with transistor 402 conducting, the current applied through resistor 410 offsets the current through resistor 412 to cause transistor 408 to conduct and provide an output potential across resistor 414. Diodes 416 and 418 are connected in the output as a circuit, and diode 420 serves as an isolating diode. The anodes of all three diodes are connected through resistor 422 to a source of positive potential, for example 18 volts. Accordingly, the output potential across resistor 414 raises the cathode of diode 416 to a positive potential with respect to the negative potential at its anode, to prevent conduction of the diode. The current through resistance 422 passes through diode 418 and resistance 424 to ground, so that no output voltage appears at the line 426 leading from the anode of diode 420.

However, when the ratchet relay 154 (FIG. 7) rotates the brush 170 into engagement with the associated contact 430, an electric circuit is completed through line 432 from the source of positive potential, through the brush 170 and contact 430, thence through line 434 and resistance 424 (FIG. 12) to ground. With a potential thus being developed across resistance 424, the anodes of the diodes 416, 418 and 420 thus are raised in potential, limited by resistance 422. The current is conducted through diode 420 and line 426 to the input of an appropriate circuit in the solenoid switch component 48 (FIG. 5).

It is to be noted from FIG. 7 that the output lines 426 from the three digit storage units representing the factors of the same numerical value, are connected together electrically and are applied through a common output line to the input of the associated solenoid switch control. Thus, for example, the output lines of the storage units 390, 440 and 398 representing zero in each of the tens, units and tenths column are connected together and led through line 442 to the input of the solenoid switch circuit 444; the output lines of storage units 446, 448 and 450 representing the digits 10, 1 and 0.1 are connected together and fed through line 452 to the input of the associated solenoid switch circuit 454; and so on.

As the ratchet relay 154 moves the brush 170 into engagement first with the contact 430, the source of positive potential is applied through line 434 to the storage units in the tenths column. As the ratchet relay then moves the brush into engagement with the contact 456, the source of potential is applied through line 458 to the storage units in the units column. Finally as the ratchet relay moves the brush into engagement with contact 460, the source of potential is applied through line 462 to the storage units in the tens column. Accordingly, it will be apparent that the solenoid switch circuits will be activated sequentially first by an activated storage unit in the tenths column, then by an activated storage unit in the units column and finally by an activated storage unit in the tens column.

Referring now to FIG. 13, wherein is illustrated the electrical circuit forming each of the solenoid switch circuits, the output pulse on line 426 from any one of the activated storage units is applied to the base of the transistor 470. This transistor normally is cut off by connection of its base to a source 472 of negative potential. However, the positive output pulse on line 426 causes the transistor to conduct and draw the base of transistor 474 to a sufficiently negative potential to cause it to conduct. Conduction of this transistor energizes the solenoid 476.

In the embodiment illustrated in FIG. 5, the solenoids are associated with an electric adding machine 50 of the type in which the digit columns are activated successively from right to left, i.e. first the tenths column, then the units column and finally the tens column. This arrangement matches the operation of the ratchet relay 154 in moving the brush 170 successively into engagement with the contacts 430, 456 and 460 associated with the tenths, units and tens columns, respectively, of the digit storage compartment. The brush 170 then engages contact 478 to activate the adding machine, whereupon the numerical value of the surface area of the measured lumber is printed on the adding machine tape.

Referring again to the prefire circuit shown in FIG. 8, it is to be noted that one or both of the transistors 52 and 56 are held in the conducting state throughout the time that the piece of lumber obstructs the associated photosensitive elements P and P'. As previously explained, conduction of either or both of these transistors effects conduction of transistor 66 to maintain the relay 68 activated and its associated contact closed, to provide a source of potential to a plurality of neon indicator lamps. There is one such indicator lamp N associated with the output of each of the length circuits (FIG. 9) and width circuits (FIG. 10), to give visible indication that these circuits are functioning. In addition, there is one indicator lamp associated with each of the digit storage units (FIG. 12) to give visible indication that these circuits are functioning. It will be apparent that the indicator lamps may be omitted, if desired.

The operation of the apparatus described hereinbefore is as follows: As a piece of material, for example lumber, is carried by the conveyor system forwardly to the position at which it interrupts the light source 22 to one or both of the photosensitive elements P and P' of the prefire circuit, the latter is activated to energize relay 68 to ready the neon lamps N, to supply the positive potential of 12 volts through line 82 to the width circuits, and to supply the positive potential of three volts through line 86 to the digit storage units. As the piece of lumber then progresses to the position at which it obstructs the source of light 22 from the photosensitive elements S and S' associated with the start circuit, the latter is activated to provide the grounding impulse through line 118 to the width circuits and, after the short time delay provided by capacitor 122, or the circuit as discussed hereinbefore, to provide the positive 12 volt potential through line 140 to the combining circuits and the positive 16 volt potential through line 142 to the length circuits. Activation of the start circuit also provides the positive 24 volt potential through line 152 to the ratcheting relay 154 which, by the use of the inherent mechanical delay of the relay mechanism, is delayed in its start of operation to insure the development of proper output pulses from the length, width and combining circuits to the digit storage units. Thereupon the ratchet relay operates to rotate the brush 170 successively into engagement with the contacts 430, 456, 460 and 478, to activate the appropriate solenoid switch circuits and adding machine to record the numerical value of the surface area of the piece of lumber.

When capacitor 102 in the start circuit becomes charged, the grounding impulse to the width circuits is terminated as well as conduction of transistor 112. However, during the rather long charging time of capacitor 102 and after the short delay (offered by capacitor 122 as well as the following circuit) the Schmidt trigger formed by transistors 116 and 124 is operated. The leading edge of the output pulse is utilized, and it is transferred through capacitor 128 operating the succeeding circuitry and providing a short duration pulse to the length, combining and ratchet relay circuits. After this short duration pulse, however, the ratcheting relay 154 still is activated by conduction of the silicon controlled rectifier 148 and transistor 150 until the brush 172 rotates into engagement with the contact 198 to short out the rectifier. At this point the brush 174 also has rotated into engagement with the contact 192 to short out the silicon controlled rectifier 78 to the prefire circuit, thereby inactivating the latter.

The ratcheting relay continues to operate, by virtue of the circuit completed from the source of positive potential through line 190, split ring 188 and engaging brush 168, until the latter disengages from the ring and moves into the insulated space between the ends of the ring. At this point the cycle of operation of the apparatus is completed.

To illustrate the foregoing, let it be assumed that a piece of lumber 8 feet long and 8 inches wide is being measured. The length circuit L8 representing 8 feet is activated, as is the width circuit W8 representing 8 inches. The output pulses from these circuits are conducted through lines 230 and 298 and the pair of diodes 480 and 482. The resulting output pulse is conducted through the common line 484 to the three diodes 486, 488 and 490 connected respectively, to transistor 368 representing zero in the tens column, transistor 492 representing five in the units column, and transistor 494 representing 0.3 in the tenths column. The outputs from these transistors are applied to the corresponding digit storage units which are scanned successively in the reverse order previously mentioned, to activate the associated solenoid switch circuits in the same order, whereupon the numerical value of 05.3 square feet is recorded on the adding machine as the surface area of the piece.

If the piece of lumber were 6 feet long and 8 inches wide, it will be apparent from FIG. 6 that the combination of output pulses will activate the transistor 368 representing zero in the tens column, the transistor 496 representing 4 in the units column and the transistor 372 representing zero in the tenths column, to register on the adding machine the surface area of 04.0 square feet. If the piece of lumber were 16 feet long and 8 inches wide the combination of output pulses will activate the transistor 498 representing 10 in the tens column, the transistor 500 representing zero in the units column and the transistor 502 representing 0.7 in the tenths column, to record on the adding machine the surface area of 10.7 square feet.

From the foregoing illustrations it will be apparent that values of square foot surface area of lumber pieces of a multiplicity of lengths and widths are measurable by means of the present apparatus. The numbers and magnitudes of dimensions may be varied as desired, by appropriate positioning of the photosensitive elements and associated openings in the length and width housings and by the inclusion of appropriate numbers of length and width circuits.

In the event it is desired to measure lengths only, or widths only, the circuits of the undesired dimensions may be disabled or disconnected from the combining circuits and the outputs from the circuits of the desired dimension connected to appropriate ones of the transistors in the tens, units and tenths columns. If board feet measurements are desired, thickness measuring circuits similar to the width or length circuits may be included in the apparatus and their outputs combined with the various width and length circuit outputs, as will be understood.

The length and width circuits described hereinbefore may be substituted for each other, if desired, and other well known types of digit storage or read-out circuits may be substituted for those illustrated. Other types of controlled rectifiers may be substituted for the silicon type mentioned hereinbefore.

Although the electrical output device has been described and illustrated herein as electrical solenoids associated with an adding machine, various other types of electrical output devices may be employed. For example, the solenoids or other suitable means may be associated with a lumber sorter to effect automatic sorting of the pieces of lumber in accordance with desired ranges of dimensions.

Although the use of photosensitive elements and associated light sources is preferred, other means may be operated by the pieces of lumber to activate the various circuits of the apparatus. For example, a plurality of electric switches, arranged for engagement by the pieces of lumber, may be employed to connect appropriate biasing potentials or otherwise to activate the corresponding circuits.

Various other modifications may be made in the details of construction and circuit arrangement described hereinbefore, without departing from the principle or scope of the invention, and it is not intended to restrict exactly to the construction shown, which is shown only as a preferred example, or to limit the invention otherwise than as set forth in the claims.

I claim:
1. Apparatus for measuring the multiplied dimensions of lumber and like dimension material, comprising:
   (a) conveyor means for the material,
   (b) a plurality of groups of first electric signal producing means, each group representing a different one of the dimensions and each signal producing means of each group being operable to produce an output signal representing a given numerical value of the associated dimension of the material,
   (c) a plurality of actuators one for each first signal producing means and arranged at predetermined spaced intervals parallel to the corresponding dimension of the material on the conveyor means for operation by the material,
   (d) a plurality of second electric signal producing means each having an input connecting together the outputs of a different one of said first signal producing means in each group thereof and each responsive thereto to produce an electric output signal representing the numerical value corresponding to the multiplication of the associated group of dimensions of the material, (e) a plurality of groups of electric signal storage means, each group representing a different numerical value and the storage means of each group representing different digits of the corresponding numerical value, (f) multiple electrical connector means connecting the outputs of the plurality of second signal producing means to the plurality of signal storage means in accordance with the numerical value represented by each output signal, (g) a plurality of electric output means each operatively associated with a different group of signal storage means, and (h) sequence control means operatively connecting each signal storage means of a group one at a time sequentially to be the associated output means.

2. The apparatus of claim 1 wherein each actuator comprises a photosensitive element, and the apparatus includes a light source directed toward the photosensitive elements and spaced from the latter for passage of the material therebetween for obstructing the light source to the photosensitive elements covered by the material, the photosensitive elements being associated one with each first signal producing means and each being operable upon a change of condition of the element to activate the associated signal producing means to produce the electric output signal therefrom.

3. The apparatus of claim 1 wherein the plurality of electrical output means comprise a plurality of solenoids operatively associated with an electric adding machine.

4. Apparatus for measuring the surface area of lumber and like dimension material comprising:
(a) conveyor means for the material,
(b) a plurality of first electric signal producing means each operable to produce an output signal representing a given numerical value of the length dimension of the material,
(c) a plurality of first actuators, one for each first signal producing means and arranged at predetermined spaced intervals parallel to the length dimension of the material on the conveyor means for operation by the material,
(d) a plurality of second electric signal producing means each operable to produce an output signal representing a given numerical value of the width dimension of the material,
(e) a plurality of second actuators one for each second signal producing means and arranged at predetermined spaced intervals parallel to the width dimension of the material on the conveyor means for operation by the material,
(f) a plurality of third electric signal producing means each having an input connecting together the outputs of different pairs of said first and second signal producing means and each responsive thereto to produce an electric output signal representing the numerical area corresponding to the associated pair of dimensions of the material,
(g) a plurality of groups of electric signal storage means, each group representing a different numerical value and the storage means of each group representing different digits of the corresponding numerical value,
(h) multiple electrical connector means connecting the outputs of the plurality of third signal producing means to the plurality of signal storage means in accordance with the numerical value represented by each output signal,
(i) a plurality of electrical output means each operatively associated with a different group of signal storage means, and
(j) sequence control means operatively connecting each signal storage means of a group one at a time sequentially to the associated output means.

5. Apparatus for measuring the surface area of lumber and the like dimensioned material, comprising:
(a) conveyor means for the material,
(b) a plurality of first photosensitive elements arranged at predetermined spaced intervals parallel to the length dimension of the material on the conveyor means,
(c) a plurality of second photosensitive elements arranged at predetermined spaced intervals parallel to the width dimension of the material on the conveyor means,
(d) a light source directed toward the photosensitive elements and spaced from the latter for passage of the material therebetween for obstructing the light source to the photosensitive elements covered by the material,
(e) a plurality of first electric signal producing means each responsive to a change of condition of a different one of the first photosensitive elements to produce an electric output signal representing a given numerical value of said length dimension of the material,
(f) a plurality of second electric signal producing means each responsive to a change of condition of a different one of the second photosensitive elements to produce an electric output signal representing a given numerical value of said width dimension of the material,
(g) a plurality of third electric signal producing means each having an input connecting together the outputs of different pairs of said first and second signal producing means and each responsive thereto to produce an electric output signal representing the numerical area corresponding to the associated pair of dimensions of the material,
(h) each of the third signal producing means having a plurality of signal outputs each representing a different digit of the corresponding numerical dimension, those signal outputs which represent the same digit being connected together as a group,
(i) a plurality of signal storage means each connected to a different one of the groups of third signal outputs and connected together in groups, each group representing a different numerical value and the storage means of each group representing different digits of the corresponding numerical value,
(j) a plurality of electrical output means each operatively associated with a different group of signal storage means, and
(k) sequence control means operatively connecting each signal storage means of a group one at a time sequentially to the associated output means.

6. The apparatus of claim 5 wherein the plurality of electrical output means comprise a plurality of solenoids operatively associated with an electric adding machine.

References Cited by the Examiner
UNITED STATES PATENTS

| 2,691,486 | 10/1954 | Work | 235—98 |
| 2,770,415 | 11/1956 | Lindesmith | 235—61 |
| 2,828,917 | 4/1958 | Wheeler et al. | 235—98 |
| 2,869,788 | 1/1959 | Turner | 235—98 X |

STEPHEN J. TOMSKY, *Primary Examiner.*